(12) United States Patent
Davidson

(10) Patent No.: US 7,377,272 B2
(45) Date of Patent: May 27, 2008

(54) METHOD AND APPARATUS FOR MEMBRANE SEPARATION OF AIR INTO NITROGEN AND OXYGEN ELEMENTS FOR USE IN INTERNAL COMBUSTION ENGINES

(75) Inventor: James G. Davidson, Paris, TN (US)

(73) Assignee: World Air Energy Corporation, Nixon, TX (US)

(*) Notice: Subject to any disclaimer, the term of this patent is extended or adjusted under 35 U.S.C. 154(b) by 16 days.

(21) Appl. No.: 11/511,166

(22) Filed: Aug. 28, 2006

(65) Prior Publication Data

US 2007/0107676 A1 May 17, 2007

Related U.S. Application Data

(63) Continuation of application No. 10/502,472, filed as application No. PCT/US02/02168 on Jan. 25, 2002, now Pat. No. 7,100,543.

(51) Int. Cl.
*F02B 41/00* (2006.01)
*F02B 23/00* (2006.01)

(52) U.S. Cl. .......................... 123/585; 123/26

(58) Field of Classification Search ............... 123/26, 123/585, 3, 586, 587, 588; 60/274, 285
See application file for complete search history.

(56) References Cited

U.S. PATENT DOCUMENTS

| | | | |
|---|---|---|---|
| 5,051,113 A * | 9/1991 | Nemser | 95/54 |
| 5,147,417 A * | 9/1992 | Nemser | 95/54 |
| 5,636,619 A | 6/1997 | Poola et al. | |
| 5,640,845 A | 6/1997 | Ng et al. | |
| 5,649,517 A | 7/1997 | Poola et al. | |
| 5,718,194 A * | 2/1998 | Binion | 123/25 C |
| 6,055,808 A | 5/2000 | Poola et al. | |
| 6,257,175 B1 * | 7/2001 | Mosher et al. | 123/3 |
| 6,289,884 B1 | 9/2001 | Blandino et al. | |
| 6,543,428 B1 * | 4/2003 | Blandino et al. | 123/585 |

OTHER PUBLICATIONS

Linda Wang, "Clean Diesel Work Wins R&D 100 Award", Logos, Fall 1999, vol. 17, No. 2.
Compact Membrane Systems, Inc., "Combustion Engine Applications", Jan. 15, 2002.
Argonne National Laboratory, "Cleaner Diesel Engines Possible With Award-Winning Technology", Frontiers 2000, Jan. 15, 2002.
Argonne Transportation, "Chemical Filter Cleans Up Diesels", Jan. 14, 2002.

(Continued)

*Primary Examiner*—Mahmoud Gimie
(74) *Attorney, Agent, or Firm*—Winstead PC

(57) ABSTRACT

A method and apparatus for reducing the emissions and improving the performance of an internal combustion engine (40). An input air stream is separated into an oxygen-enriched air stream and a nitrogen-enriched air stream. The nitrogen-enriched air stream is received by a holding chamber (35). The oxygen-enriched air and a combustible fuel are provided to a combustion chamber (45) of the internal combustion engine (40) and a combustion process is initiated. After a predefined time delay, a volume of nitrogen-enriched air is provided from the holding chamber (35) to the combustion chamber (45) to be used during the rest of the combustion process.

29 Claims, 3 Drawing Sheets

OTHER PUBLICATIONS

The University of Manchester, "Diesel Emissions Overview," Maintenance Engineering Research, Jan. 15, 2002.

Argonne National Laboratory, "Modifying Intake Air to Reduce Unwanted Emissions in Diesel Engines", Apr. 2001.

Systems Fire Group, "Hollow Fiber Membrane Gas Separation", Jan. 15, 2002.

John DeGaspari, "Cleaner Diesels", Mechanical Engineering Power, Jan. 15, 2002.

Technology Transfer at Argonne, "Clean-Diesel Breakthrough: Simultaneous Decrease in Emissions of Both Particulates and Oxides of Nitrogen During Combustion", Argonne National Laboratory, Jan. 15, 2002.

R.J.R. Uhlhorn et al., "Gas Separations With Inorganic Membrane".

Compact Membrane Systems, Inc., "Hollow Fiber Membrane Module and Nitrogen Enriched Air for Reduced Diesel Engine Nox," Jan. 15, 2002.

hHp:11 www.100megsfree4.com/dictionary/car-dicn.htm, "Dictionary of Automotive Terms Abbreviations," Jan. 21, 2002.

* cited by examiner

METHOD AND APPARATUS FOR MEMBRANE SEPARATION OF AIR INTO NITROGEN AND OXYGEN ELEMENTS FOR USE IN INTERNAL COMBUSTION ENGINES

CROSS-REFERENCE TO RELATED APPLICATIONS

This application is a continuation of U.S. patent application Ser. No. 10/502,472, filed Nov. 23, 2004, now U.S. Pat. No. 7,100,543 and comprising the National Stage of International Patent Application No. PCT/US02/02168, filed Jan. 25, 2002, both of which being incorporated herein by reference in their entirety.

BACKGROUND OF THE INVENTION

1. Technical Field of the Invention

This invention relates to a method and system for reducing emissions and improving performance of an internal combustion engine by providing oxygen-enriched air and nitrogen-enriched air to a combustion chamber.

2. Description of Related Art

The purpose of an internal combustion engine is to convert the chemical energy of fuel into the mechanical energy of motion using a process of combustion. As is known, internal combustion engines are used extensively in a variety of machines including mobile vehicles, or for other purposes, such as power generation. However, internal combustion engines produce emissions from the combustion process which include a number of pollutants whose presence are undesirable in the environment. As a result, numerous regulations have been implemented by various government bodies requiring reductions in these pollutants. The primary pollutants produced by internal combustion engines during the combustion process include oxides of nitrogen (NOx), carbon monoxide (CO), particulate matter (PM), and hydrocarbons (HC). Nitrogen oxides (NOx), such as nitric oxide and nitrogen dioxide, are formed during the combustion process when air combines with oxygen under the high temperature conditions of the engine's combustion chamber. Nitrogen oxides contribute to the formation of ozone, smog, and acid-rain. Carbon monoxide is formed during the combustion process from the incomplete combustion of the air-fuel mixture. Carbon monoxide is a colorless, odorless, and toxic gas, and is one of the most dangerous of the combustion process pollutants. Particulate matter is also formed during incomplete combustion and consists of a mixture of solid and liquid matter whose main constituent is carbon. Particulate matter is a major source of visible urban air pollution such as soot and haze. Hydrocarbons are formed from the combustible fuel and lubrication oils and additives used within the engine. Both particulate matter and hydrocarbons are suspected carcinogens. In comparison to gasoline engines, diesel engines have particularly high concentrations of nitrogen oxides and particulate matter contained in their emissions.

It has been known in the past that the introduction of oxygen-enriched air into the combustion chamber during the combustion process allows for more complete combustion and results in a reduction in the formation of particulate matter, carbon monoxide, and hydrocarbons. An increase in fuel efficiency, as well as engine power, can also be achieved through oxygen-enrichment. However, oxygen-enrichment of the combustion process results in an undesirable change in NOx production, as well as an increase in combustion temperatures, which can cause engine overheating. An example of an oxygen-enrichment of intake air is described in U.S. Pat. No. 5,636,619. The method described in U.S. Pat. No. 5,636,619 requires the use of a suitable NOx after-treatment device in the exhaust stream to attempt to reduce the higher level of NOx generated by the oxygen-enrichment. However, U.S. Pat. No. 5,636,619 does not offer a solution to the problem of engine overheating caused by oxygen-enrichment of intake air.

The introduction of nitrogen-enriched air into the exhaust stream of an internal combustion engine has also been known in the past to reduce NOx present in the exhaust gases. U.S. Pat. No. 5,640,845 describes a NOx reduction method which includes the injection of atomic nitrogen into the exhaust gases of an internal combustion engine. However, U.S. Pat. No. 5,640,845 also does not offer a solution to the problem of engine overheating caused by oxygen-enrichment of intake air.

The present invention provides for a reduction in emission pollutants, as well as increased fuel efficiency and engine power, while reducing or eliminating the disadvantages of prior methods. The introduction of nitrogen-enriched air into the combustion chamber after the start of combustion provides for a reduction in the formation of NOx, while reducing or eliminating the problem of engine overheating caused by oxygen-enrichment of intake air.

SUMMARY OF THE INVENTION

The present invention comprises a method and apparatus for reducing the emissions and improving the performance of an internal combustion engine. An input air stream is separated at least in part into an oxygen-enriched air stream and a nitrogen-enriched air stream. The nitrogen-enriched air stream is received by a holding chamber. The oxygen-enriched air and a combustible fuel are provided to a combustion chamber of the internal combustion engine and a combustion process is initiated. After a predefined time delay, a volume of nitrogen-enriched air is provided from the holding chamber to the combustion chamber to be used during the rest of the combustion process.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
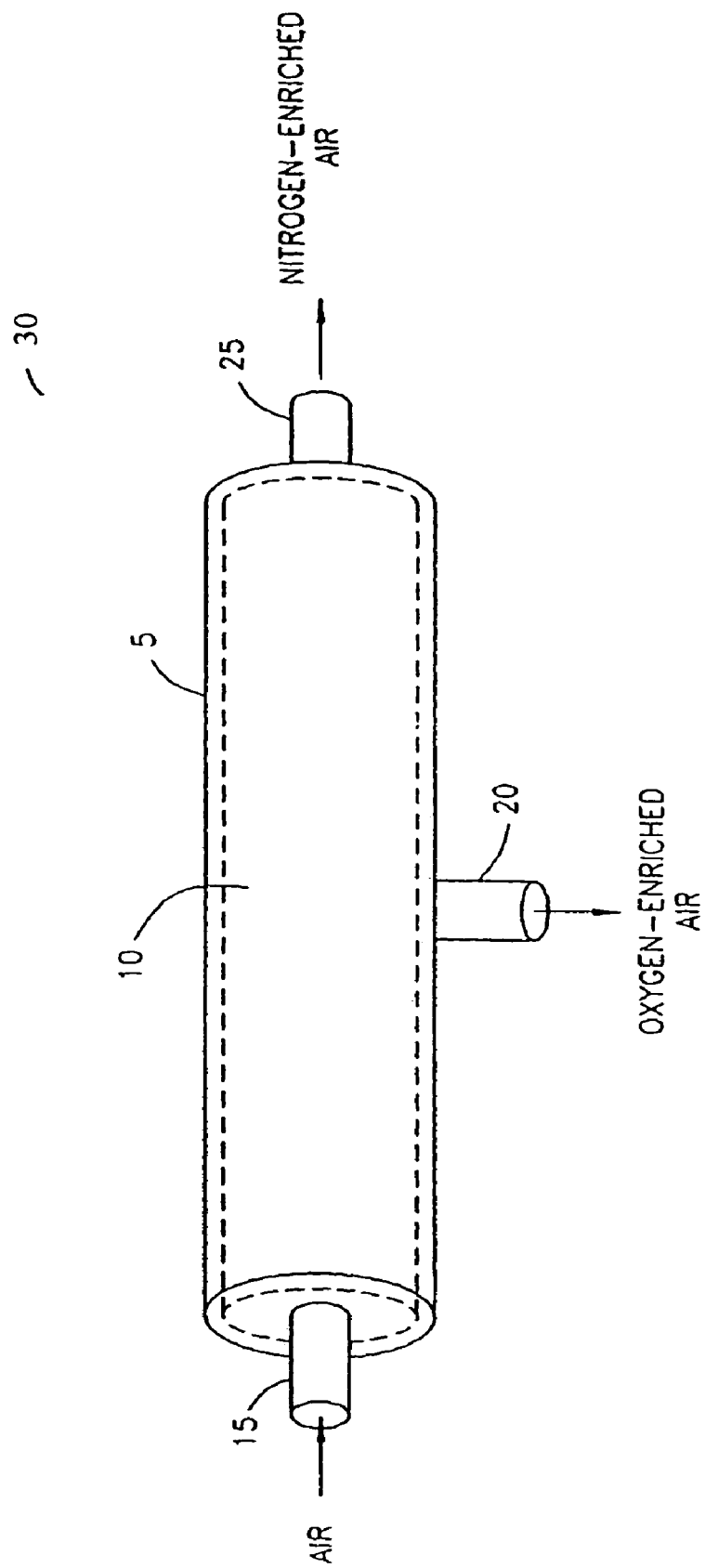
FIG. 1 is a membrane 5 for the separation of air into nitrogen and oxygen elements in accordance with the principles of the present invention.

Reference is now made to the Drawings wherein like reference characters denote like or similar parts throughout the various Figures. Referring now to FIG. 1, a membrane 5 for the separation of air into nitrogen and oxygen elements in accordance with the principles of the present invention is illustrated. The membrane 5 functions to separate air directed into the membrane 5 into oxygen-enriched air streams and nitrogen-enriched air streams. The membrane 5 contains an inner membrane material 10, which through a process of selective permeation or solution-diffusion separates the air directed through the membrane material 10 into an oxygen-enriched air stream and a nitrogen-enriched air stream. This process can be accomplished due to the fact that oxygen has a higher solubility through the inner membrane material 10 than that of nitrogen. Typically, the membrane material 10 is composed of a bundle of hollow polymer fibers which selectively allow oxygen molecules to diffuse through the membrane wall while allowing nitrogen molecules to pass through the hollow fibers without being absorbed.

During operation, an air stream is directed into the membrane 5 through an air input port 15. Oxygen-enriched air is extracted from the membrane 5 through an oxygen-enriched air output port 20 at a negative pressure relative to that of the air at the air input port 15. Nitrogen-enriched air is extracted from the membrane S through a nitrogen-enriched air output port 25 at a high pressure relative to that of the oxygen-enriched air. The desired high pressure of the input air stream can be achieved by compressing, by various methods, the air stream prior to providing the air stream to the air input port 15. The purity of the nitrogen-enhanced air stream can be adjusted according to the flow rate, pressure, and temperature of the air stream fed into the membrane 5.

Figure 2:
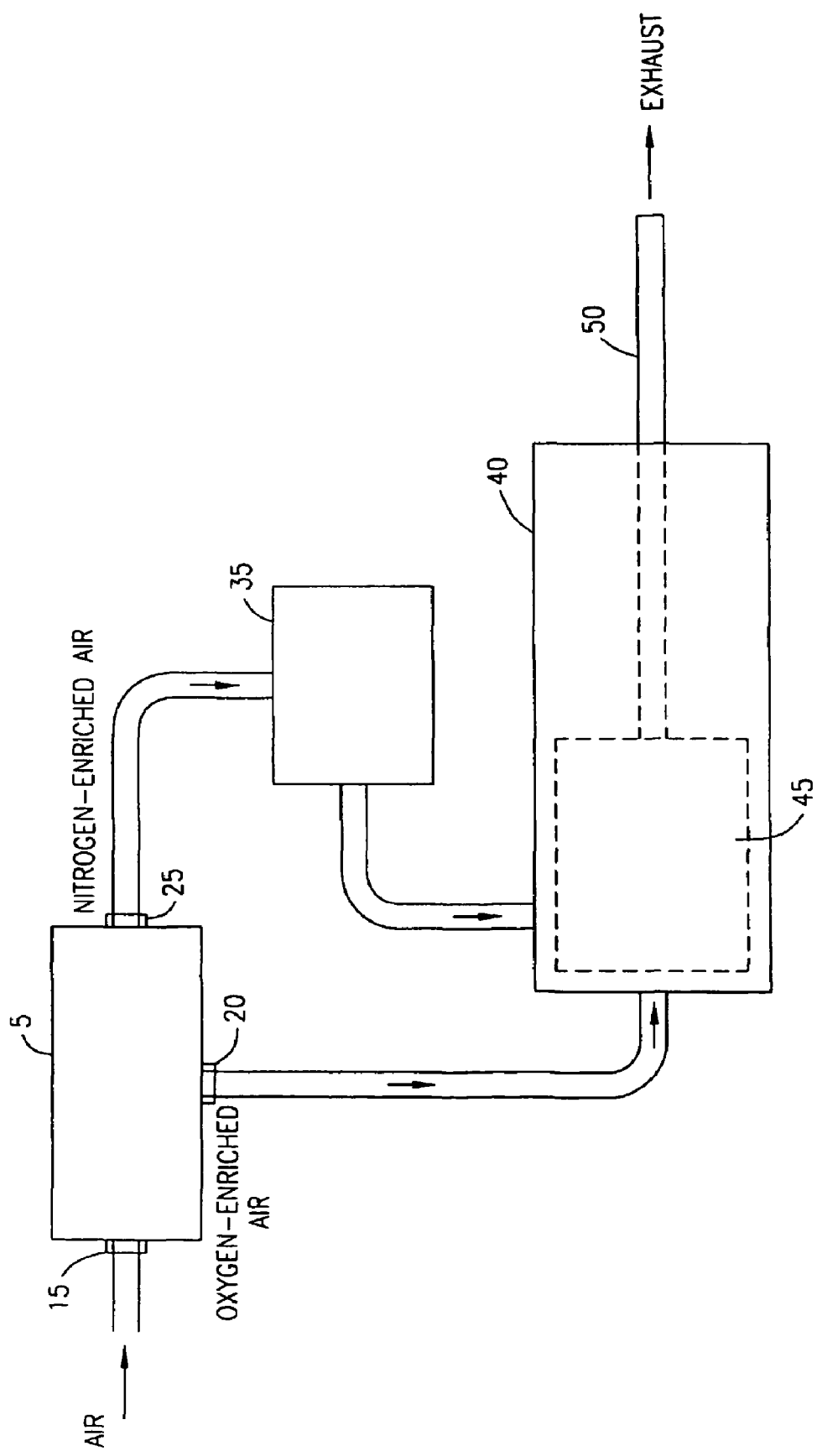
FIG. 2 is an apparatus 30 for the separation of air into nitrogen-enriched air streams and oxygen-enriched air streams for use in an internal combustion engine in accordance with the principles of the present invention.

Referring now to FIG. 2, an apparatus 30 for the separation of air into nitrogen-enriched air streams and oxygen-enriched air streams for use in an internal combustion engine in accordance with the principles of the present invention is illustrated. An input air stream is directed into the air input port 15 of the membrane 5 which separates the air into an oxygen-enriched air stream which is output through an oxygen-enriched air output port 20, and a nitrogen-enriched air stream which is output through a nitrogen-enriched air output port 25. The oxygen-enriched air stream is at a negative pressure relative to the pressure of the nitrogen-enriched air stream. In an example embodiment of the present invention, the oxygen-enriched air stream is at a negative pressure of 16 inches, and the nitrogen-enriched air stream is at a pressure of 75 psi. The oxygen-enriched air from the oxygen-enriched air output port 20 is directed into a combustion chamber 45 of an internal combustion engine 40, such as a diesel or gasoline engine, and the nitrogen-enriched air is directed from the nitrogen-enriched air output port 25 into a holding chamber 35. In an embodiment of the present invention, a compressor or blower, such as a turbocharger or supercharger, may be used to increase the pressure of the input air stream before it is directed into the air input port 15 in order to allow the membrane 5 to more efficiently separate the oxygen and nitrogen elements of the air. Although the present embodiment of the invention is illustrated by the use of a membrane, it should be understood that other methods and devices for separating an air stream into oxygen-enriched air streams and nitrogen-enriched air streams could be used.

After the introduction of the oxygen-enriched air into the combustion chamber 45, a combustion process using the oxygen-enriched air and combustible fuel is initiated. The introduction of the oxygen-enriched air into the combustion chamber 45 allows for more complete combustion, produces more engine power, and increases fuel efficiency. In addition, the amount of particulate matter, carbon dioxide, and hydrocarbons present in the engine emissions is significantly reduced.

After a predefined time delay following the start of the combustion process, a predefined volumetric mass of nitrogen-enriched air is released from the holding chamber 35 and directed into the combustion chamber 45 to be used in the remainder of the combustion process. In one embodiment of the present invention, the time delay for the introduction of nitrogen-enriched air is four milliseconds and the predefined volumetric mass of nitrogen is equal to that which gives a volumetric mass in the combustion chamber 45 of ninety percent nitrogen and one percent unknown composition. However, the predefined time delay and predefined volumetric mass of nitrogen-enriched air may be chosen based on a variety of factors including the burn rate of the fuel, the gas composition in the combustion chamber, speed of the engine, etc. In addition, the predefined volumetric mass can be changed continuously according to the operating conditions of the engine 40. Because combustion is already in progress, the nitrogen mass does not convert easily to NOx. As a result, NOx emissions are greatly reduced. The reduced emissions provided by the present invention eliminates the need for a catalytic convertor. The introduction of nitrogen also provides for the added benefit of cooling the combustion chamber 45, which produces more engine power per volume of fuel and prevents overheating of the engine 40. Control of the release of the nitrogen-enriched air from the holding chamber 35 can be accomplished through a variety of means including injection nozzles, electronic valves, mechanical valves, pumps, etc. After the combustion process is complete, the exhaust emissions are expelled from the combustion chamber 45 through an exhaust outlet 50.

In accordance with an alternative embodiment of the present invention, the oxygen-enriched air and nitrogen-enriched air are provided from separate sources, such as storage tanks, without the use of a membrane to separate the oxygen and nitrogen elements from an input air stream.

Figure 3:
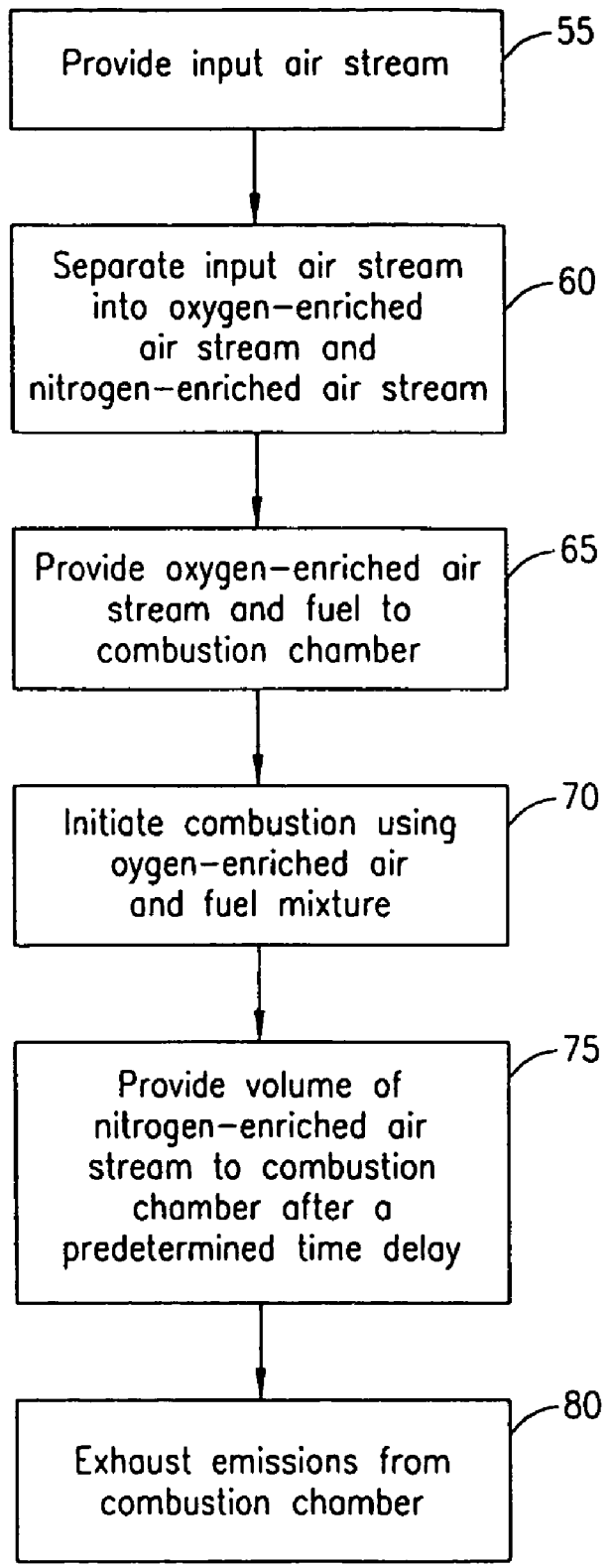
FIG. 3 is a method in flowchart form for the separation of air into nitrogen-enriched air streams and oxygen-enriched air streams for use in an internal combustion engine in accordance with the principles of the present invention.

Referring now to FIG. 3, a method for the separation of air into nitrogen-enriched air streams and oxygen-enriched air streams for use in an internal combustion engine in accordance with the principles of the present invention is illustrated in flowchart form. In step 55, an input air stream is provided to an oxygen and nitrogen separation device. In step 60, the input air stream is separated into an oxygen-enriched air stream and a nitrogen-enriched air stream. In step 65, the oxygen-enriched air stream and combustible fuel are provided to the combustion chamber of an internal combustion engine. Next, in step 70, combustion is initiated using the oxygen-enriched air and fuel mixture. As previously described in reference to FIG. 2, the introduction of the oxygen-enriched air into the combustion chamber allows for more complete combustion, produces more engine power, and increases fuel efficiency, as well as reduces the amount of particulate matter, carbon dioxide; and hydrocarbons present in the engine emissions. In step 75, a volume of the nitrogen-enriched air is provided to the combustion chamber after a predetermined time delay to be used in the remainder of the combustion process, thereby reducing NOx emissions and cooling the combustion chamber. Finally, in step 80, the emissions are exhausted from the combustion chamber. The method is repeated for each cycle of the combustion process.

Experimental results have shown that emissions, such as NOx and carbon monoxide, can be reduced by eighty-two percent using the principles of the present invention. For example, a diesel engine that typically exhausts 2900 pounds of particulate matter per year into the atmosphere is expected to be reduced by 2378 pounds per year by using the principles of the present invention.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. Apparatus for the operation of an internal combustion engine comprising:
   means for providing oxygen-enriched air and fuel to a combustion chamber;
   means for initiating combustion of the oxygen-enriched air and fuel in said combustion chamber; and
   means for providing, separately from the oxygen-enriched air, a predefined volume of nitrogen-enriched air to the combustion chamber following a predefined time delay for use of the nitrogen-enriched air during the remainder of combustion within said combustion chamber;
   wherein the predefined time delay is based upon at least one of burn rate of the fuel, combustion chamber gas composition, and engine speed.

2. The apparatus of claim 1 further comprising: means for separating an input air stream to produce the oxygen-enriched air and the nitrogen-enriched air.

3. The apparatus of claim 2, wherein the means for separating an input air stream comprises a membrane.

4. The apparatus of claim 3, further comprising: means for providing the input air stream to the membrane.

5. The apparatus of claim 2, further comprising: means for compressing the input air stream prior to separating the input air stream to produce the oxygen-enriched air and the nitrogen-enriched air.

6. The apparatus of claim 1, further comprising: means for holding the predefined volume of nitrogen-enriched air prior to providing the predefined volume of nitrogen enriched air to the combustion chamber.

7. The apparatus of claim 6, further comprising: means for releasing the predefined volume of nitrogen-enriched air from the means for holding to the combustion chamber.

8. The apparatus of claim 7, wherein the means for releasing the predefined volume of nitrogen-enriched air comprises at least one of an injection nozzle, an electronic valve, a mechanical valve, and a pump.

9. The apparatus of claim 1, wherein the predefined time delay comprises substantially four milliseconds.

10. The apparatus of claim 1, wherein the predefined volume of nitrogen-enriched air comprises substantially ninety-percent of the volumetric mass within the combustion chamber.

11. The apparatus of claim 1, wherein the internal combustion engine comprises a diesel engine.

12. The apparatus of claim 1, wherein the internal combustion engine comprises a gasoline engine.

13. A method for the operation of an internal combustion engine having a combustion chamber, the method comprising the steps of:
   providing means for separating an input air stream to produce oxygen-enriched air and nitrogen-enriched air;
   receiving an input air stream in said separating means and producing oxygen-enriched air and nitrogen-enriched air therefrom;
   receiving the nitrogen-enriched air from said separation means in a first chamber adapted for flow communication with said combustion chamber; receiving the oxygen-enriched air from said separation means within said combustion chamber in combination with a combustible fuel for combustion therein; and
   selectively discharging said nitrogen-enriched air from said first chamber into said combustion chamber after a predefined time delay relative to initial combustion therein for use of said nitrogen-enriched air during the remainder of the combustion, wherein the predefined time delay is based upon at least one of burn rate of the combustible fuel, combustion chamber gas composition, and engine speed.

14. The method of claim 13, wherein the means for separating an input air stream comprises a membrane.

15. The method of claim 14, further comprising: providing means for compressing the input air stream prior to separating the input air stream to produce the oxygen-enriched air and the nitrogen-enriched air.

16. The method of claim 13, wherein the predefined time delay comprises substantially four milliseconds.

17. The method of claim 13, wherein the volumetric mass of nitrogen-enriched air discharged into the combustion chamber comprises substantially ninety-percent of the volumetric mass within the combustion chamber.

18. The method of claim 13, wherein the internal combustion engine comprises a diesel engine.

19. The method of claim 13, wherein the internal combustion engine comprises a gasoline engine.

20. The method of claim 13, further comprising: holding the predefined volume of nitrogen-enriched air within the first chamber prior to providing the nitrogen-enriched air to the combustion chamber.

21. The method of claim 13, further comprising: repeating the steps of the method for each combustion cycle of the internal combustion engine.

22. A method for the separation of air into nitrogen-enriched and oxygen-enriched air streams and subsequent use in an internal combustion engine for improving the efficiency thereof in reducing the amount of particulate matter therefrom, the method comprising the steps of:
   exposing the input air stream to a membrane adapted for separating the input air into an oxygen-enriched air stream and a nitrogen-enriched air stream and the segregation thereof;
   injecting the oxygen-enriched air stream into a combustion chamber with fuel;
   initiating combustion of the oxygen-enriched air and the fuel within said combustion chamber; and
   injecting the nitrogen-enriched air stream into said combustion chamber subsequent to the initiation of combustion therein, wherein the injecting of the nitrogen-enriched air stream into the combustion chamber is performed after a predefined time delay, said predefined time delay is based upon at least one of burn rate of the fuel, combustion chamber gas composition, and engine speed.

23. The method of claim 22, further comprising: compressing the input air stream prior to separating the input air stream into the oxygen-enriched air stream and the nitrogen-enriched air stream.

24. The method of claim 22, wherein the predefined time delay comprises substantially four milliseconds.

25. The method of claim 22, wherein the volumetric mass of nitrogen-enriched air injected into the combustion chamber comprises substantially ninety-percent of the volumetric mass within the combustion chamber.

26. The method of claim 22, wherein the internal combustion engine comprises a diesel engine.

27. The method of claim 22, wherein the internal combustion engine comprises a gasoline engine.

28. The method of claim 22, further comprising: holding the nitrogen-enriched air stream within a first chamber prior to injecting the nitrogen-enriched air stream into the combustion chamber.

29. The method of claim 22, further comprising: repeating the steps of the method for each combustion cycle of the internal combustion engine.

\* \* \* \* \*

UNITED STATES PATENT AND TRADEMARK OFFICE
CERTIFICATE OF CORRECTION

PATENT NO.         : 7,377,272 B2                                           Page 1 of 1
APPLICATION NO. : 11/511166
DATED              : May 27, 2008
INVENTOR(S)        : James G. Davidson It is certified that error appears in the above-identified patent and that said Letters Patent is hereby corrected as shown below:

COLUMN 3, LINE 24

Replace    "S"
With       --5--

Signed and Sealed this

Twenty-first Day of October, 2008

JON W. DUDAS
*Director of the United States Patent and Trademark Office*